(12) United States Patent
Bak et al.

(10) Patent No.: US 8,586,223 B2
(45) Date of Patent: Nov. 19, 2013

(54) CYLINDRICAL SECONDARY BATTERY

(75) Inventors: Hyo-Rim Bak, Yongin-si (KR);
Jin-Bum Kim, Yongin-si (KR);
Wan-Mook Lim, Yongin-si (KR);
Hae-Kwon Yoon, Yongin-si (KR);
Myoung-Han Ryu, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 284 days.

(21) Appl. No.: 12/862,625

(22) Filed: Aug. 24, 2010
(Under 37 CFR 1.47)

(65) Prior Publication Data

US 2011/0045341 A1 Feb. 24, 2011

(30) Foreign Application Priority Data

Aug. 24, 2009 (KR) .................. 10-2009-0078159

(51) Int. Cl.
*H01M 6/10* (2006.01)
*H01M 2/02* (2006.01)
(52) U.S. Cl.
USPC ............................................. 429/94; 429/164
(58) Field of Classification Search
None
See application file for complete search history.

(56) References Cited

U.S. PATENT DOCUMENTS

2003/0215700 A1 11/2003 Hosoda et al.
2006/0073380 A1* 4/2006 Kim et al. ..................... 429/129
2007/0269711 A1* 11/2007 Meguro et al. ................. 429/94

2008/0241646 A1 10/2008 Sawa et al.
2009/0226799 A1 9/2009 Yamashita et al.
2009/0246619 A1 10/2009 Bak

FOREIGN PATENT DOCUMENTS

| KR | 10-1998-0036679 | 8/1998 |
| KR | 10-2006-0102748 | 9/2006 |
| KR | 10-2007-0037882 | 4/2007 |
| KR | 10-2008-0027502 | 3/2008 |
| KR | 10-2008-0036443 | 4/2008 |
| KR | 1020080058968 A | 6/2008 |
| KR | 10-2008-0066311 | 7/2008 |
| KR | 20080084450 A | 9/2008 |

OTHER PUBLICATIONS

Korean Notice of Allowance issued on Dec. 26, 2011 in connection with Korean Patent Application Serial No. 10-2009-0078159 and Request for Entry of the Accompanying Office Action attached herewith.
Korean Office Action issued by Korean Patent Office on May 31, 2011, corresponding to KR 10-2009-0078159 and Request for Entry of the Accompanying Office Action attached herewith.

* cited by examiner

*Primary Examiner* — Ula C Ruddock
*Assistant Examiner* — Matthew Van Oudenaren
(74) *Attorney, Agent, or Firm* — Robert E. Bushnell, Esq.

(57) ABSTRACT

A secondary battery that includes a cylindrical can, an electrode assembly arranged in a jelly-role configuration within the cylindrical can and having a core extending about an axis thereof and a hollow center pin arranged within the core of the electrode assembly and having an inner diameter and an outer diameter, the outer diameter forming ones of a pair of radial lengths diametrically opposite from each other, each of said pair of radial lengths extending from the outer diameter of the center pin to an external surface of the core, wherein the sum of the pair of radial lengths is in the range of 5% to 54% of the inner diameter of the center pin.

16 Claims, 2 Drawing Sheets

CYLINDRICAL SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 24 Aug. 2009 and there duly assigned Serial No. 10-2009-0078159.

BACKGROUND OF THE INVENTION

1. Field of the Invention

The present invention relates to a cylindrical secondary battery, and more particularly, to a cylindrical secondary battery having a center pin capable of improved exhaustion of heat and gas resulting in improved safety by preventing combustion and explosion.

2. Description of the Related Art

Generally, as handheld wireless devices including video cameras, mobile phones and notebook computers are getting compact and multi-functionalized, research on secondary batteries used as a driving power source for these devices is being conducted.

Secondary batteries can be embodied as a nickel-cadmium (Ni—Cd) battery, a nickel-metal hydride (Ni-MH) battery, a nickel-zinc (Ni—Zn) battery, or a lithium (Li) secondary battery. Among them, the Li secondary battery is rechargeable and compact, has a high capacity, a high operating voltage and a high energy density per unit weight, resulting in it being widely used in high technology electronic devices.

The secondary batteries can be classified into cylindrical, prismatic and pouch types depending on the shape of a battery case. Here, cylindrical or prismatic type includes an electrode assembly arranged in a cylindrical or prismatic metal can, and the pouch type includes an electrode assembly arranged in a pouch-type case made out of an aluminum-laminated sheet.

In addition, the electrode assembly in the battery case is a rechargeable power-generating device arranged in a stacked structure of a positive electrode, a separator and a negative electrode. The electrode assembly is classified into a jelly-roll type in which a separator is interposed between a positive electrode and a negative electrode, which are formed in long sheets on which an active material is applied, and a stack type in which a plurality of positive and negative electrodes having a predetermined size are sequentially stacked at opposite sides of a separator. The jelly-roll type electrode assembly is easily manufactured and has a high energy density per unit weight, and thus is mainly used in cylindrical and prismatic batteries.

The cylindrical Li secondary battery includes an electrode assembly wound in a cylindrical shape, a cylindrical can housing the electrode assembly, an electrolyte to allow ions to move, and a cap assembly connected to one side of the cylindrical can to prevent leakage of the electrolyte and prevent separation of the electrode assembly from the can.

Meanwhile, during overcharge or overcurrent, the secondary batteries increase in inner temperature, thereby generating gas. The gas flows toward the cap assembly through a core of the wound electrode assembly and a center pin arranged in the core prevents deformation of the electrode assembly during the charging and discharging of the battery.

A safety vent of the cap assembly is deformed due to the flowing gas, and a circuit in the battery is broken due to the safety vent, thereby preventing the combustion and explosion of the secondary battery.

However, in recent times, as the number of windings in the electrode assembly increases to enlarge the capacity of the cylindrical secondary battery, the diameter of the center of the electrode assembly is reduced.

Accordingly, when the cylindrical secondary battery is combusted, the electrode assembly is deformed due to heat. Through the narrow core, heat and gas generated in the secondary battery find it difficult to be exhausted, resulting in deterioration of safety and reliability of the secondary battery.

SUMMARY OF THE INVENTION

Aspects of the present invention provide a cylindrical secondary battery in which a center pin is formed to have an optimized inner diameter with respect to a diameter of a core to prevent combustion and explosion, resulting in improved safety and reliability.

According to one aspect of the present invention, there is provided a secondary battery that includes a cylindrical can, an electrode assembly arranged in a jelly-role configuration within the cylindrical can and having a core extending about an axis thereof and a hollow center pin arranged within the core of the electrode assembly and having an inner diameter and an outer diameter, the outer diameter forming ones of a pair of radial lengths diametrically opposite from each other, each of said pair of radial lengths extending from the outer diameter of the center pin to an external surface of the core, wherein the sum of the pair of radial lengths is in the range of 5% to 54% of the inner diameter of the center pin.

The electrode assembly can include a first electrode plate, a second electrode plate and a separator arranged between the first and second electrode plates. The inner diameter of the center pin can be inversely proportional to the sum of the pair of radial lengths. The core can have a diameter in the range of 3.8 to 4.2 mm. When the core has a diameter of approximately 4.2 mm, and the center pin has a thickness of approximately 0.1 mm, the center pin can have an inner diameter in the range of 2.6 to 3.8 mm, and the sum of the radial lengths from the external surface of the core to the outer diameter of the center pin can be in the range of 0.2 to 1.4 mm. The center pin can have a vertical length in the range of 57 to 59 mm.

According to another aspect of the present invention, there is provided a secondary battery that includes a cylindrical can, an electrode assembly arranged in a jelly-role configuration within the cylindrical can and in snug contact with an inner surface of said cylindrical can and having a core extending about an axis thereof and a hollow center pin having a closed circular cross section arranged concentrically within the core of the electrode assembly and having an inner diameter I and an outer diameter, a first radial distance D being defined as a distance from the outer diameter of the center pin to a nearest point on an external surface of the core, wherein the radial distance D and the inner diameter I satisfy the inequality $0.05\ I \leq 2D \leq 0.54\ I$.

The electrode assembly can include a first electrode plate, a second electrode plate and a separator arranged between the first and second electrode plates. The inner diameter of the center pin can be inversely proportional to the radial distance D. The core can have a diameter in the range of 3.8 to 4.2 mm When the core has a diameter of approximately 4.2 mm, and when the center pin has a thickness of approximately 0.1 mm, the center pin can have an inner diameter in the range of 2.6 to 3.8 mm, and 2D is in the range of 0.2 to 1.4 mm The center pin can have a vertical length in the range of 57 to 59 mm.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
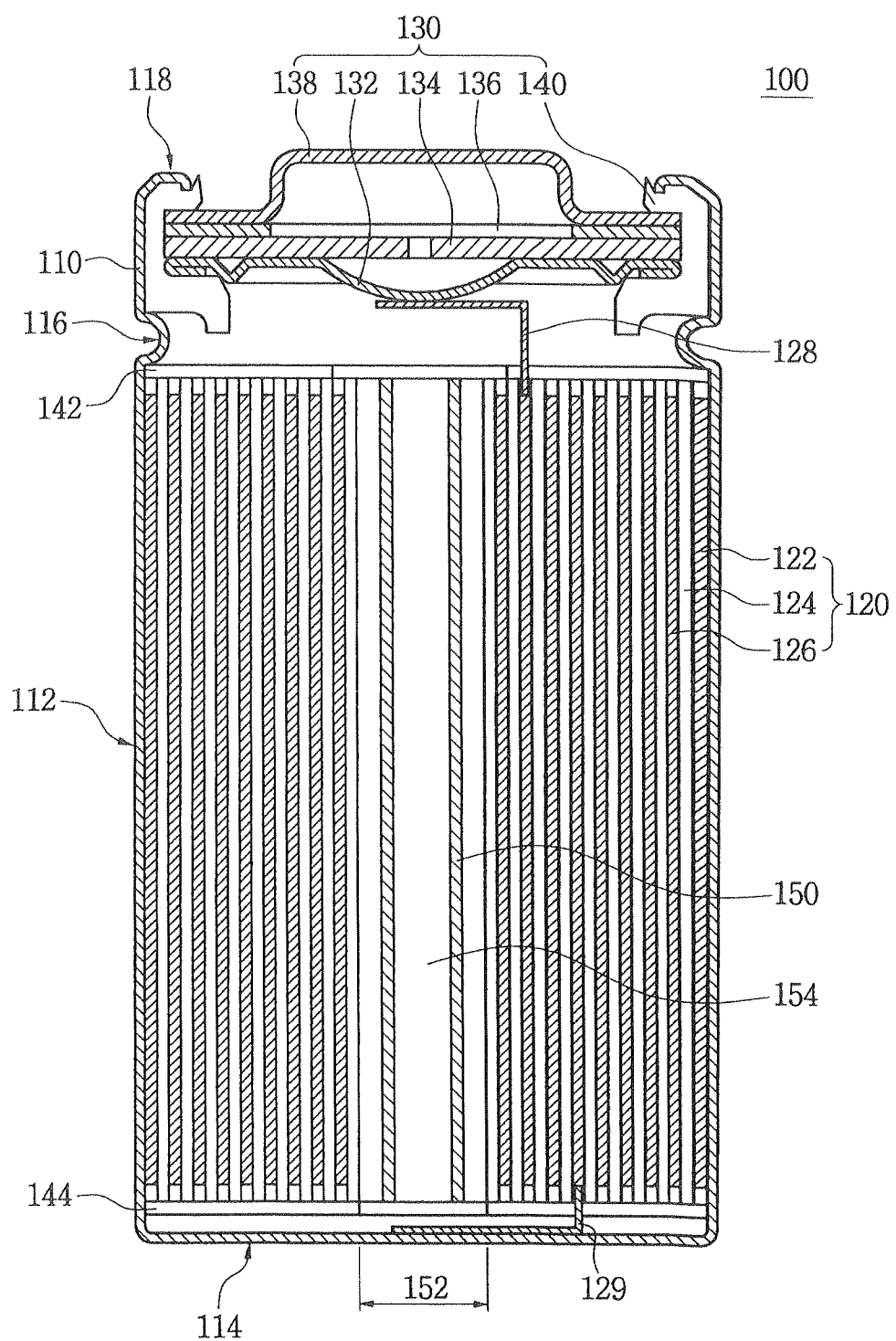
FIG. 1 is a cross-sectional view of a cylindrical secondary battery according to an exemplary embodiment of the present invention.

Reference will now be made in detail to the present embodiments of the present invention, examples of which are shown in the accompanying drawings. Further, in the drawings, the length and thickness of a layer and a region can be exaggerated for convenience. In addition, like reference numerals refer to the like elements throughout the specification.

Figure 2:
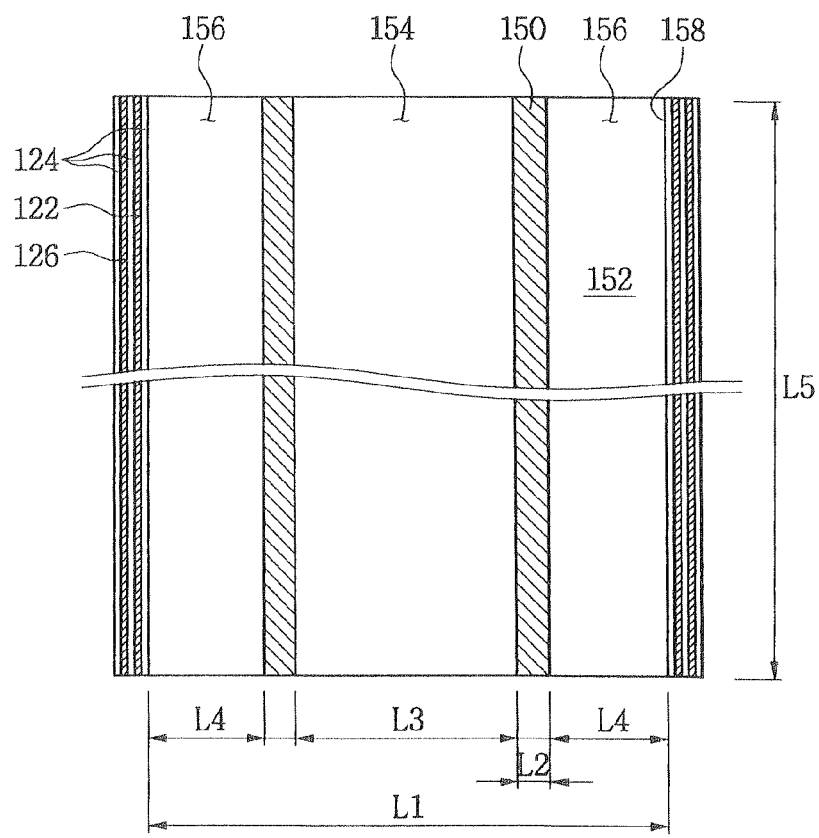
FIG. 2 is a schematic cross-sectional view illustrating a core and a center pin of FIG. 1.
Figure 3:
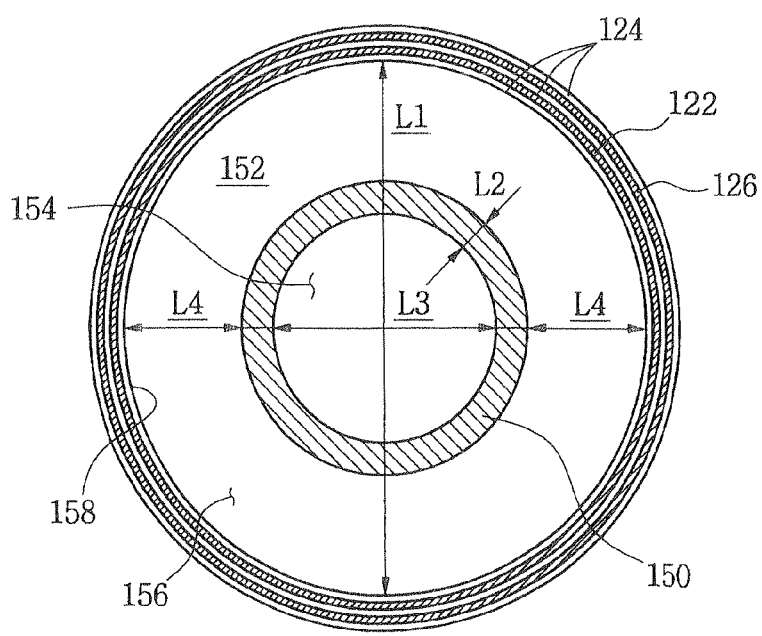
FIG. 3 is a schematic plan view illustrating the core and the center pin of FIG. 1.

FIG. 1 is a cross-sectional view of a cylindrical secondary battery according to an exemplary embodiment of the present invention, FIG. 2 is a schematic cross-sectional view illustrating a core and a center pin of FIG. 1, and FIG. 3 is a schematic plan view illustrating the core and the center pin of FIG. 1.

Referring to FIG. 1, a cylindrical secondary battery 100 according to an exemplary embodiment of the present invention includes a cylindrical can 110, an electrode assembly 120, a cap assembly 130, and a center pin 150. The cylindrical can 110 houses the electrode assembly 120 and an electrolyte, and the electrode assembly 120 serves as a rechargeable power-generating device. The cap assembly 130 is assembled to an upper portion of the cylindrical can 110, thereby sealing the cylindrical can 110 to prevent separation of the electrode assembly 120 from the cylindrical can 110.

The center pin 150 is arranged at a core 152 of the electrode assembly 120 to prevent deformation of the electrode assembly 120 during charging or discharging of the secondary battery, and serves as a path to allow gases generated in the cylindrical can 110 to escape.

The electrode assembly 120 can include a first electrode plate 122 on which a positive electrode active material is coated, a second electrode plate 126 on which a negative electrode active material is coated, and a separator 124 interposed between the first and second electrode plates 122 and 126.

The first electrode plate 122 serves as a positive electrode plate and can be made out of a conductive metal foil such as an aluminum (Al) foil, and can include positive electrode non-coating portions at both ends of the first electrode plate 122 on which the positive electrode active materials are not coated.

The second electrode plate 126 serves as a negative electrode plate and can be made out of a conductive metal foil such as copper (Cu) or nickel (Ni) foil and can include negative electrode non-coating portions at both ends of the second electrode plate 126 on which the negative electrode active materials are not coated.

The electrode assembly 120 can include a first electrode tab 128 made out of Al and extending a predetermined length from the positive electrode non-coating portions of the first electrode plate 122. In addition, the electrode assembly 120 can include a second electrode tab 129 made out of Ni and extending a predetermined length from the negative electrode non-coating portion of the second electrode plate 126.

The separator 124 prevents an electrical short circuit between the first and second electrode plates 122 and 126, and allows ions to move.

The electrode assembly 120 is wound in a circular direction, which means that the first electrode plate 122, the separator 124 and the second electrode plate 126 are wound in a jelly-roll configuration, and then housed within the cylindrical can 110.

The core 152 formed by the electrode assembly 120 can have a larger diameter than a conventional core in order to facilitate exhaustion of heat and gas which can be generated by the secondary battery. For example, the diameter of the core can be about 3.8 to 4.2 mm.

The electrode assembly 120 can be arranged to be tightly fitted to the cylindrical can 110 to reduce a void between the cylindrical can 110 and the electrode assembly 120. By preventing the formation of a void between the cylindrical can 110 and an exterior of the electrode assembly, heat and gas generated by the secondary battery can be easily exhausted through the core 152 without occupying and stagnating in a space between the electrode assembly 120 and the cylindrical can 110.

Upper and lower insulating plates 142 and 144 can be arranged at upper and lower portions of the electrode assembly 120 to prevent direct contact between the cap assembly 130 and the cylindrical can 110.

The cylindrical can 110 can include a cylindrical side 112 having a predetermined diameter and a bottom 114 covering a lower portion of the side 112 to have a predetermined space capable of housing the electrode assembly 120, and an upper portion of the cylindrical can 110 that is open to allow for insertion of the electrode assembly 120 therein.

The second electrode tab 129 connected to the negative electrode non-coating portion of the electrode assembly 120 can be joined to a center of the bottom 114 of the cylindrical can 110, and thus the cylindrical can 110 can be in electrical contact with the second electrode plate 126 to serve as a negative electrode terminal.

The cylindrical can 110 can have a crimped portion 118 formed by bending an upper portion of the cylindrical can 110 inward to press an upper portion of the cap assembly 130. Here, the cap assembly 130 is connected to an opening, which is arranged at an upper portion of the cylindrical can 110.

The cylindrical can 110 can also have a beaded portion 116 formed by bending the cylindrical can 110 inward to fix the cap assembly 130 in place between the beaded portion 116 and the crimped portion 118. The location of the beaded portion 116 is spaced from the crimping portion by a distance that corresponds to the thickness of the cap assembly 130.

The cap assembly 130 can include a safety vent 132, a current breaker 134, a positive temperature coefficient (PTC) element 136, an electrode cap 138 and an insulating gasket 140.

The safety vent 132 can be made out of metal, joined to the first electrode tab 128 and thus electrically connected to the positive first electrode plate 122. The safety vent 132 can have a protrusion in the middle, which projects toward the bottom 114 of the cylindrical can 110. The protrusion can be deformed so that it projects in an upward direction of the cylindrical can 110 or be broken when pressure within the cylindrical secondary battery 100 builds.

The current breaker 134 can be electrically and mechanically connected to the safety vent 132 at an upper portion of the safety vent 132, and thus can be broken when the safety vent 132 is deformed or broken. The PTC element 136 is electrically and mechanically connected to the current breaker 134 at an upper portion of the current breaker 134.

The electrode cap 138 can be electrically and physically connected to the PTC element 136 at an upper portion of the PTC element 136 to serve as a terminal to apply a current to the outside.

The insulating gasket 140 can surround sides of the safety vent 132, the current breaker 134, the PTC element 136 and the electrode cap 138 to fix the safety vent 132, the current breaker 134, the PTC element 136 and the electrode cap 138 these elements in place. In addition, the insulating gasket 140 can insulate the cylindrical can 110 which serves as the negative electrode from the electrode cap 138 serves as the positive electrode.

Referring to FIGS. 2 and 3, the center pin 150 has a center hole 154, and can be made out of a metal such as stainless steel which has excellent mechanical strength and chemical resistance. The center pin 150 is arranged in the core 152 to prevent deformation or movement of the electrode assembly 120. Moreover, the center pin 150 can serve as a path to allow gas generated in the cylindrical can 110 to escape toward the cap assembly 130.

The center pin 150 can be arranged to create an external space 156 between an external surface of the center pin 150 and an internal boundary of the electrode assembly 120 in order to prevent damage to the separator 124 of electrode assembly 120 that forms an outer boundary of the core 152 and the inner boundary of the electrode assembly 120.

The core 152 can be formed to have a larger diameter than the conventional core to provide for easy exhaust of heat and gas which can be generated within the secondary battery. The diameter of the core can be about 3.8 to 4.2 mm.

The center pin 150 can be formed to have a greater vertical length L5 than a conventional center pin, for example, about 57 to 59 mm, and have a thickness L2 of about 0.1 mm so that the gas and heat produced by the electrode assembly 120 can easily escape.

When the diameter L1 of the core 152 and the thickness L2 of the center pin 150 are fixed, an inner diameter L3 of the center pin 150 can be inversely proportional to a length L4 of the external space 156. That is, in the cross-sectional view, when the inner diameter L3 (or I) of the center pin 150 increases, the lengths L4 (or D) of the external spaces 156 arranged at both sides of the center pin 150 decreases.

In the cross-sectional view, the sum of the lengths L4 of both external spaces 156 extending from the external surface 158 of the core 152 to the outer diameter of the center pin 150 can be 5 to 54% of the inner diameter L3 of the center pin 150 when the diameter L1 of the core 152 and the thickness L2 of the center pin 150 are fixed. This can be expressed by the following inequality.

Inequality 1: $0.05L_3 \leq 2L_4 \leq 0.54L_3$

Hereinafter, the following examples are provided to explain the present invention in further detail, but the scope of the present invention is not limited to these examples.

Example 1

As shown in FIGS. 1 to 3, a center pin 150 made out of metal was manufactured to have a thickness L2 of 0.1 mm, a height L5 of 59 mm, and an inner diameter L3 of 2.6 to 3.8 mm. The center pin 150 was inserted into a core 152 of an electrode assembly 120 having a diameter L1 of 4.2 mm, and thus a cylindrical secondary battery was completed.

Comparative Example 1

As shown in FIGS. 1 to 3, a center pin 150 made out of metal was manufactured to have a thickness L2 of 0.1 mm, a height L5 of 59 mm, and an inner diameter L3 of 0.5 to 2.3 mm The center pin 150 was inserted into a core 152 of an electrode assembly 120 having a diameter L1 of 4.2 mm, and thus a cylindrical secondary battery was completed.

Experimental Example 1

As shown in Table 1, combustion tests were performed on 10 samples of each of 7 kinds of cylindrical secondary batteries manufactured in Example 1 and 6 kinds of cylindrical secondary batteries manufactured in Comparative example 1. The combustion tests were performed by heating a horizontal middle portion of the cylindrical secondary battery for a predetermined time using a torch, and confirming whether the cylindrical secondary battery ignites or explodes due to the heat applied thereto.

TABLE 1

| | | Diameter of Core L1(mm) | Thickness of Center Pin L2(mm) | Height of Center Pin L5(mm) | Inner diameter of Center Pin L3(mm) | Distance between Outer Diameter of Center Pin and External Surface of Core L4(mm) | (L4 × 2)/L3 (%) | Success Rate for 10 Samples (%) |
|---|---|---|---|---|---|---|---|---|
| Example 1 | S1 | 4.2 | 0.1 | 59 | 3.8 | 0.1 | 5 | 100 |
| | S2 | | | | 3.6 | 0.2 | 11 | 100 |
| | S3 | | | | 3.4 | 0.3 | 18 | 100 |
| | S4 | | | | 3.2 | 0.4 | 25 | 100 |
| | S5 | | | | 3.0 | 0.5 | 33 | 100 |
| | S6 | | | | 2.8 | 0.6 | 43 | 100 |
| | S7 | | | | 2.6 | 0.7 | 54 | 100 |
| C. example 1 | S1 | | | | 2.3 | 0.9 | 78 | 60 |
| | S2 | | | | 2.1 | 1.0 | 95 | 50 |
| | S3 | | | | 1.8 | 1.1 | 122 | 50 |
| | S4 | | | | 1.5 | 1.3 | 173 | 30 |
| | S5 | | | | 1.0 | 1.5 | 300 | 40 |
| | S6 | | | | 0.5 | 1.8 | 720 | 10 |

As a result, among the samples of the cylindrical secondary batteries according to Example 1, when the diameter L1 of the core 152 and the thickness L2 of the center pin 150 are fixed, as seen from the cross-sectional view, it can be concluded that samples having the sum of the both lengths L4 from the external surface 158 of the core 152 to the outer diameter of the center pin 150, that amounts from 5 to 54% of the inner diameter L3 of the center pin 150, was neither combusted nor exploded. That is, it can be concluded that although the shape of the electrode assembly in the secondary battery is deformed due to heat, the center pin 150 can easily exhaust the gas and heat generated inside, thereby preventing the combustion or explosion of the battery.

On the other hand, it can be concluded that 4 to 9 out of 10 samples among each of the cylindrical secondary batteries according to Comparative example 1 combusted or exploded when the sum of the both lengths L4 from the external surface 158 of the core 152 to the outer diameter of the center pin 150 exceeded 54% of the inner diameter L3 of the center pin 150.

As described above, in the cylindrical secondary battery in which the cylindrical can is tightly fitted to the electrode assembly to increase the diameter of the core of the electrode assembly and reduce an outside void volume, the inner diameter of the center pin is controlled to have a predetermined distance ratio with respect to a distance between the outer diameter of the center pin arranged in the core and the external surface of the core. This is done for a center pin having an increased vertical length.

That is, when the diameter of the core and the thickness and the vertical length (height) of the center pin are fixed as seen from the cross-sectional view, the cylindrical to secondary battery can have the center pin, in which the sum of both lengths from the external surface of the core to the outer diameter of the center pin is 5 to 54% of the inner diameter of the center pin.

Accordingly, the heat and gas generated in the secondary battery does not remain in a space between the electrode assembly and the cylindrical can, and can be exhausted through the core. Although the shape of the electrode assembly in the secondary battery may deform, the heat and gas generated inside the can be easily exhausted through the center pin.

In addition, as the vertical length of the center pin increases, the gas and heat generated inside can easily escape, thereby reducing an amount of the gas remaining at an upper portion of the center pin. Moreover, as the vertical length of the center pin increases, noise generated in the secondary battery can also be reduced.

Therefore, due to the easy escape the heat and gas which can be generated in the secondary battery, the combustion or explosion of the cylindrical secondary battery can be prevented, resulting in an improvement in safety and reliability of the cylindrical secondary battery.

According to the present invention, it is possible to manufacture a cylindrical secondary battery where a cylindrical can is tightly fitted to an electrode assembly to increase a diameter of a core of the electrode assembly, and where an inner diameter of the center pin is controlled such that a distance between an outer diameter of the center pin arranged in the core and an external surface of the core is from 5 to 54% of the inner diameter of the center pin, and where a vertical length of the center pin is increased.

Thus, heat and gas generated in the secondary battery can be easily exhausted through the core and the center pin without remaining in a space between the electrode assembly and the cylindrical can. Even though the shape of the electrode assembly in the secondary battery may deform, the gas and heat inside can easily escape through the center pin.

Consequently, due to easy exhaustion of heat and gas generated in the secondary battery, combustion or explosion of the cylindrical secondary battery can be prevented, resulting in an improvement in safety and reliability of the cylindrical secondary battery.

Although a few embodiments of the present invention have been shown and described, it would be appreciated by those skilled in the art that changes can be made in this embodiment without departing from the principles and spirit of the invention, the scope of which is defined in the claims and their equivalents.

What is claimed is:

1. A cylindrical secondary battery, comprising:
   a hollow center pin having a closed circular cross section and being disposed in a core of an electrode assembly formed in a jelly-roll type,
   wherein the sum of both lengths from an external surface of the core to an outer diameter of the center pin corresponds to 5 to 11% of an inner diameter of the center pin, wherein when the core has a diameter of approximately 4.2 mm, and the center pin has a thickness of 0.1 mm to prevent explosion and combustion of the battery by facilitating the escape of exhaust gas and heat generated within the battery, the center pin has an inner diameter in the range of 3.6 to 3.8 mm, and the sum of the radial lengths from the external surface of the core to the outer diameter of the center pin is in the range of 0.2 to 0.4 mm.

2. The secondary battery of claim 1, wherein the electrode assembly comprises:
   a first electrode plate;
   a second electrode plate; and
   a separator arranged between the first and second electrode plates.

3. The secondary battery of claim 1, wherein the inner diameter of the center pin is inversely proportional to the sum of the lengths from an external surface of the core to an outer diameter of the center pin.

4. The secondary battery of claim 1, wherein the core has a diameter of 4.2 mm.

5. The secondary battery of claim 1, wherein the center pin has a vertical length in the range of 57 to 59 mm.

6. A secondary battery, comprising:
   a cylindrical can;
   an electrode assembly arranged in a jelly-roll configuration within the cylindrical can and in snug contact with an inner surface of said cylindrical can and having a core extending about an axis thereof; and
   a hollow center pin having a closed circular cross section and arranged concentrically within the core of the electrode assembly and having an inner diameter I and an outer diameter, a radial distance D being defined as a distance from the outer diameter of the center pin to a nearest point on an external surface of the core, wherein the radial distance D and the inner diameter I satisfy the inequality $0.05\ I \le 2D \le 0.16\ I$ to prevent explosion and combustion of the battery by facilitating the escape of exhaust gas and heat generated within the battery.

7. The secondary battery of claim 6, wherein the electrode assembly comprises:
   a first electrode plate;
   a second electrode plate; and
   a separator arranged between the first and second electrode plates.

8. The secondary battery of claim 6, wherein the inner diameter of the center pin is inversely proportional to the radial distance D.

9. The secondary battery of claim 6, wherein the core has a diameter of 4.2 mm.

10. The secondary battery of claim 6, wherein when the core has a diameter of approximately 4.2 mm and when the center pin has a thickness of 0.1 mm, the center pin has an inner diameter in the range of 3.6 to 3.8 mm, and 2D is in the range of 0.195 to 0.4 mm.

11. The secondary battery of claim 6, wherein the center pin has a vertical length in the range of 57 to 59 mm.

12. A secondary battery, comprising:
a cylindrical can;
an electrode assembly arranged in a jelly-roll configuration within the cylindrical can and in snug contact with an inner surface of said cylindrical can and having a core extending about an axis thereof; and
a hollow center pin having a closed ring shape cross section and having a length in the range of 57 to 59 mm arranged concentrically within the core of the electrode assembly and having an inner diameter I and an outer diameter, a radial distance D being defined as a distance from the outer diameter of the center pin to a nearest point on an external surface of the core, wherein the radial distance D and the inner diameter I satisfy the inequality $0.05\ I \le 2D \le 0.16\ I$.

13. The secondary battery of claim 12, wherein the electrode assembly comprises:
a first electrode plate;
a second electrode plate; and
a separator arranged between the first and second electrode plates.

14. The secondary battery of claim 12, wherein the inner diameter of the center pin is inversely proportional to the radial distance D.

15. The secondary battery of claim 12, wherein the core has a diameter of 4.2 mm.

16. The secondary battery of claim 12, wherein when the core has a diameter of approximately 4.2 mm and when the center pin has a thickness of 0.1 mm, the center pin has an inner diameter in the range of 3.6 to 3.8 mm, and 2D is in the range of 0.2 to 0.4 mm to prevent explosion and combustion of the battery by facilitating the escape of exhaust gas and heat generated within the battery.

* * * * *